US011193846B2

(12) United States Patent
Beers et al.

(10) Patent No.: US 11,193,846 B2
(45) Date of Patent: Dec. 7, 2021

(54) COMPRESSIBLE ELEMENT FOR A SENSOR ASSEMBLY

(71) Applicants: TE Connectivity Services GmbH, Schaffhausen (CH); Measurement Specialties, Inc., Hampton, VA (US)

(72) Inventors: Megan Hoarfrost Beers, Redwood City, CA (US); Miguel Morales, Fremont, CA (US); Vishrut Vipul Mehta, Philadelphia, PA (US); Yilang Wu, San Ramon, CA (US); Ting Gao, Palo Alto, CA (US); Vincent Wong, San Jose, CA (US); Jonathan Tran, Milpitas, CA (US); Natasha V. Kachenko, Palo Alto, CA (US)

(73) Assignees: TE CONNECTIVITY SERVICES GMBH, Schaffhausen (CH); MEASUREMENT SPECIALTIES, INC., Hampton, VA (US)

( * ) Notice: Subject to any disclaimer, the term of this patent is extended or adjusted under 35 U.S.C. 154(b) by 31 days.

(21) Appl. No.: 16/819,985

(22) Filed: Mar. 16, 2020

(65) Prior Publication Data
US 2021/0285837 A1    Sep. 16, 2021

(51) Int. Cl.
*G01L 19/14*    (2006.01)
(52) U.S. Cl.
CPC .................................... *G01L 19/14* (2013.01)

(58) Field of Classification Search
None
See application file for complete search history.

(56) References Cited

U.S. PATENT DOCUMENTS

| 5,983,725 | A | * | 11/1999 | Fischer | G01L 5/228 |
| | | | | | 250/231.19 |
| 6,073,497 | A | * | 6/2000 | Jiang | G01L 1/205 |
| | | | | | 73/862.68 |
| 6,155,120 | A | * | 12/2000 | Taylor | A61B 5/1036 |
| | | | | | 73/862.046 |
| 6,826,968 | B2 | * | 12/2004 | Manaresi | G06F 3/0446 |
| | | | | | 73/862.046 |
| 6,915,701 | B1 | * | 7/2005 | Tarler | A61B 5/1036 |
| | | | | | 73/774 |
| 8,161,826 | B1 | * | 4/2012 | Taylor | G01L 1/18 |
| | | | | | 73/862.044 |
| 8,393,229 | B2 | * | 3/2013 | Tao | A43B 3/0005 |
| | | | | | 73/862.046 |
| 9,027,408 | B2 | * | 5/2015 | Toth | G01L 9/02 |
| | | | | | 73/719 |

* cited by examiner

*Primary Examiner* — Andre J Allen
*Assistant Examiner* — Jermaine L Jenkins

(57) ABSTRACT

A compressible element for a sensor assembly includes an elastomer matrix having a first compressibility and a plurality of closed areas distributed within the elastomer matrix and each surrounded by the elastomer matrix. Each of the closed areas has a second compressibility greater than the first compressibility.

20 Claims, 5 Drawing Sheets

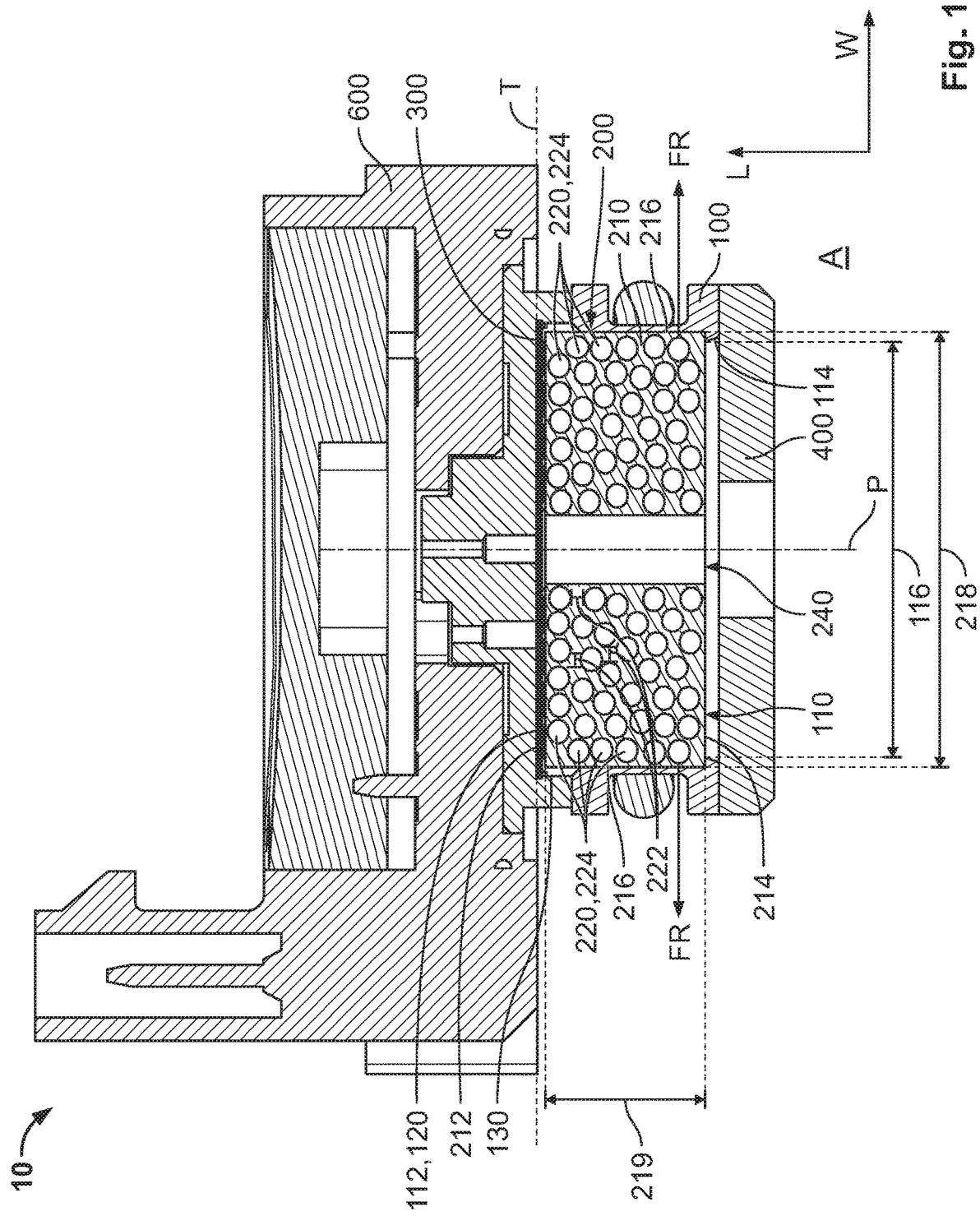

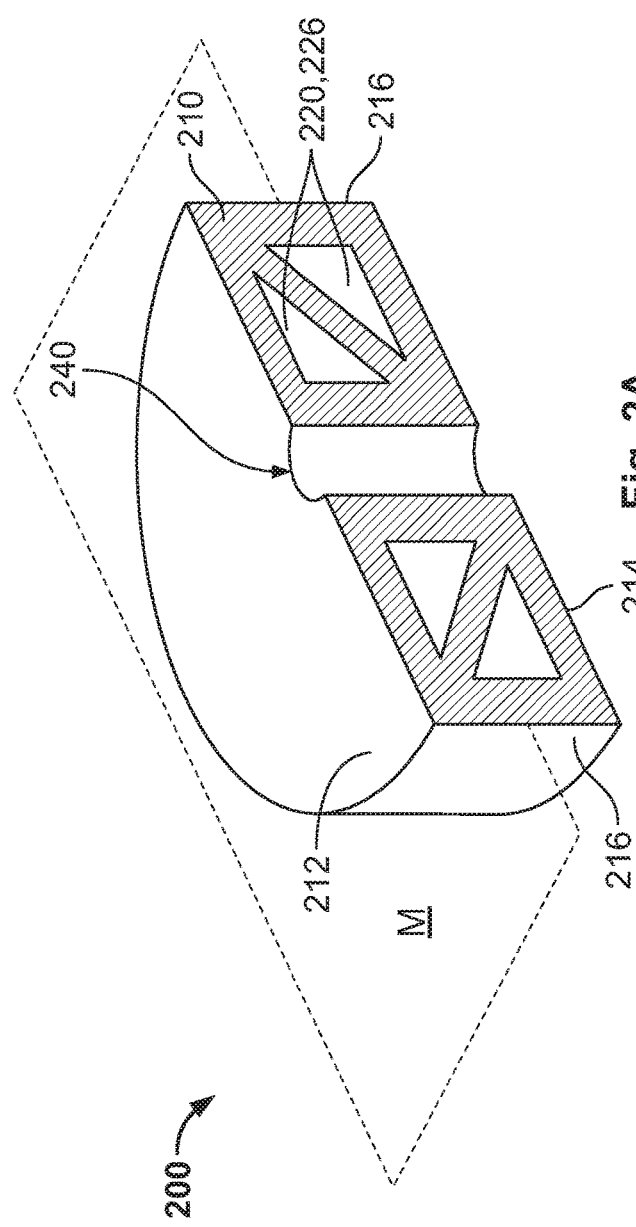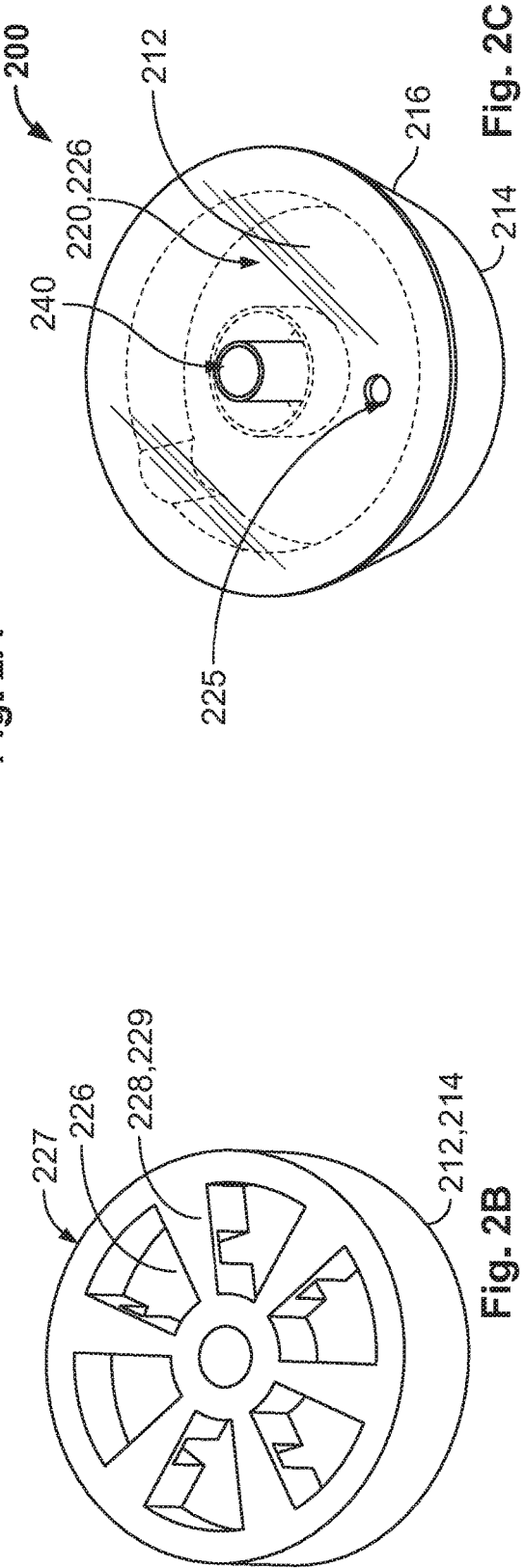

COMPRESSIBLE ELEMENT FOR A SENSOR ASSEMBLY

FIELD OF THE INVENTION

The present invention relates to a sensor assembly and, more particularly, to a compressible element for a sensor assembly.

BACKGROUND

Some sensor or transducer assemblies have a sensing element and a compressible plug disposed within a structure of the sensor assembly. A pressure sensor assembly of this type, for example, is positioned in a tank containing a fluid. The fluid surrounds the compressible plug and is in contact with the sensing element to detect a level and a flow rate of the fluid. The fluid can freeze under certain environmental conditions, leading to significant expansion of the fluid; the compressible plug compensates for volume variations in the surrounding fluid to protect the sensing element from damage.

Compressible plugs for sensor assemblies are commonly made from solid elastomers, however, solid elastomers do not offer sufficient compressibility to compensate for the volume variations in many applications. In compressible plugs formed of more compressible closed-cell porous elastomers, a pore structure of the closed-cell elastomer material is difficult to control, leading to an uneven distribution of pores with thin and weak walls between the pores. Further, the closed-cell elastomer material is often cut from a formed material, exposing pores on the cut edges, which leads to infiltration of the liquid into the compressible plug. The weak structure of the pores and infiltration of liquid make the compressible plug mechanically vulnerable and unable to maintain the requisite compressibility through cyclic freezing and thawing, leading to potential damage of the sensor element.

SUMMARY

A compressible element for a sensor assembly includes an elastomer matrix having a first compressibility and a plurality of closed areas distributed within the elastomer matrix and each surrounded by the elastomer matrix. Each of the closed areas has a second compressibility greater than the first compressibility.

BRIEF DESCRIPTION OF THE DRAWINGS

The invention will now be described by way of example with reference to the accompanying Figures, of which:

FIG. 1 is a sectional side view of a sensor assembly according to an embodiment;

FIG. 2A is a sectional perspective view of a compressible element according to an embodiment;

FIG. 2B is a perspective view of a shell of a compressible element according to another embodiment;

FIG. 2C is a perspective view of a compressible element according to another embodiment;

DETAILED DESCRIPTION OF THE EMBODIMENTS

Figure 3A:
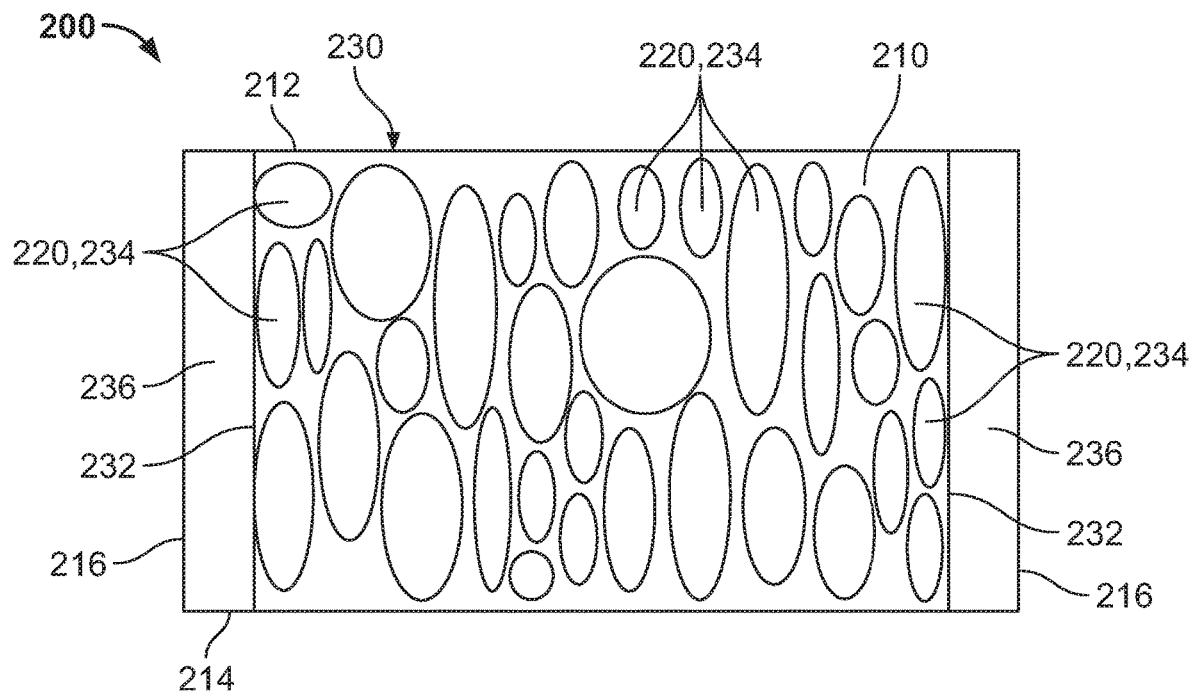
FIG. 3A is a sectional side view of a compressible element according to another embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A sensor assembly 10 according to an embodiment is shown in FIG. 1. The sensor assembly 10 comprises a cavity structure 100, a compressible element 200 disposed within the cavity structure 100, a sensor element 300 disposed within the cavity structure 100, and a ledge adapter 400 attached to the cavity structure 100.

The cavity structure 100, as shown in FIG. 1, includes a cavity 110 defined by an interior surface 120 and a cavity wall 130. The interior surface 120 is positioned at an interior end 112 of the cavity 110 and an exterior end 114 of the cavity 110 opposite the interior end 112 is open to an area A exterior of the cavity structure 100. In the shown embodiment, the cavity 110 is cylindrical. In other embodiments, the cavity 110 could be a rectangular prism or any other shape capable of receiving the compressible element 200 and the sensor element 300. The cavity 110 has a cavity width 116 in a width direction W.

The compressible element 200, as shown in the embodiments of FIG. 1-3B, includes an elastomer matrix 210, a plurality of closed areas 220 distributed within the elastomer matrix 210 and each surrounded by the elastomer matrix 210, and a passageway 240 extending through the elastomer matrix 210. The elastomer matrix 210 has a first compressibility and each of the closed areas 220 has a second compressibility greater than the first compressibility.

The compressible element 200, as shown in FIGS. 1-3B, has an interior side 212, an exterior side 214 opposite the interior side 212, and plurality of lateral sides 216 connecting the interior side 212 to the exterior side 214. Between the lateral sides 216, the compressible element 200 has an elastomer width 218 in the width direction W and an elastomer length 219 in a length direction L perpendicular to the width direction W, as shown in FIG. 1. In the shown embodiments, the compressible element 200 has a cylindrical shape corresponding to the cavity 110. In other embodiments, the elastomer matrix 210 could be a rectangular prism or any other shape corresponding to the shape of the cavity 110.

The elastomer matrix 210, in various embodiments, can be formed from a silicone, a fluorosilicone, an epoxy, or any other elastomeric material. A hardness of the elastomer matrix 210 can be selected based on the application; a harder elastomer matrix 210 is more resilient to high-pressure environments, while a softer elastomer matrix 210 is more suited for compressibility. The elastomer matrix 210 has a chemical compatibility suited for the application. In an embodiment in which the elastomer matrix 210 is exposed to a diesel exhaust fluid (DEF) as described below, for example, the elastomer matrix 210 is selected to avoid deterioration under DEF exposure.

The compressible element 200, as shown in FIGS. 1-3B, includes only closed areas 220; none of the areas within the elastomer matrix 210 having the second compressibility are open to a side 212, 214, 216 of the compressible element 200. An exposed surface of each of the sides 212, 214, 216 of the elastomer matrix 210 is a continuous, uninterrupted elastomeric material.

The closed areas 220 can each be a hollow void having the second compressibility or can each be filled with a solid material having the second compressibility. A size of each of the closed areas 220 can be selected depending on the application; larger closed areas 220 increase the compressibility of the compressible element 200, while smaller closed areas 220 lead to increased strength and are more resilient to high-pressure environments. The closed areas 220, in the embodiments of FIGS. 1-2B, are distributed in the elastomer matrix 210 such that the elastomer matrix 210 has approximately a same thickness 222 disposed between each of the closed areas 220 and a nearest adjacent closed area 220.

The passageway 240, as shown in FIGS. 1 and 2A, extends through the elastomer matrix 210 from the interior side 212 through the exterior side 214 in an axial direction P. In the shown embodiment, the passageway 240 is positioned approximately centrally in the elastomer matrix 210. In other embodiments, the passageway 240 could be positioned off-center in the elastomer matrix 210.

Particular embodiments of the compressible element 200 shown in FIGS. 1-3B will now be described individually in greater detail.

In the embodiment of the compressible element 200 shown in FIG. 1, each of the closed areas 220 is formed by a polymeric microsphere 224. The compressible element 200 is formed by mixing the plurality of polymeric microspheres 224 into an uncured liquid elastomer of the elastomer matrix 210, pouring the mixture into a mold or the cavity 110, and curing the mixture to form the compressible element 200. This process results in the uniform thickness 222 between the closed areas 220 described above and shown in FIG. 1.

The polymeric microspheres 224 forming the closed areas 220 can be hollow or solid. A weight percentage of the polymeric microspheres 224 in comparison with the uncured liquid elastomer is selected to influence the compressibility of the compressible element 200. In an embodiment, hollow polymeric microspheres 224 are incorporated at 0-4% by weight of the uncured liquid elastomer of the elastomer matrix 210. A size of each of the polymeric microspheres 224 is also selected to influence the compressibility of the compressible element 200. In an embodiment, each of the polymeric microspheres 224 has a diameter less than 200 µm.

A compressible element 200 according to another embodiment, as shown in FIGS. 2A-2C, is formed with the closed areas 220 as a plurality of contained volumes 226 defined by the elastomer matrix 210. The contained volumes 226 are hollow voids within the elastomer matrix 210. In the embodiments shown in FIGS. 2A and 2B, the contained volumes 226 are each formed as a polyhedron having, for example, a triangular shape or forming a trapezoidal wheel pattern. In other embodiments, the contained volumes 226 could have an annular shape as shown in FIG. 2C, a spherical shape, a cylindrical shape, or could have any other three-dimensional shape. In an embodiment, as shown in FIGS. 2B and 2C, the contained volumes 226 can be connected to one another to form a continuous closed area 220 surrounded by the elastomer matrix 210. The shape of the contained volumes 226, a total volume of the contained volumes 226, a size of each of the contained volumes 226, and a thickness of the elastomer matrix 210 between the contained volumes 226 is adjustable and selected according to the balance of compressibility and mechanical strength desired for a particular application.

The compressible element 200, in an embodiment, is created by attaching a first shell 227 shown in FIG. 2B to an identical second shell 227. Each of the shells 227 forms half of the compressible element 200. To attach the shells 227 to one another, an adhesive 229 is applied on a mating face 228 of each of the shells 227, and the mating faces 228 are placed in abutment with one another along a mating plane M shown in FIG. 2A to define the plurality of contained volumes 226. In an embodiment, the adhesive 229 is an uncured elastomer formed of a same material as the elastomer matrix 210. In other embodiments, the adhesive 229 can be a glue or a bonding layer. In another embodiment, instead of forming each of the shells 227 as half of the compressible element 200, the compressible element 200 can be formed as a cap attached to a remainder of the compressible element 200.

The shells 227 or other parts of the compressible element 200 shown in FIGS. 2A and 2B can each be formed in a mold or, in another embodiment, the shells 227 or other parts of the compressible element 200 can each be formed by 3D printing or additive manufacturing the material of the elastomer matrix 210. The 3D printing can be a material jetting, a material extrusion, a stereolithography, or a digital light processing type of 3D printing.

In another embodiment, the entirety of the compressible element 200 shown in FIG. 2A can be 3D printed with a drain hole 225, as shown in FIG. 2C, and an uncured material taking the place of the contained volumes 226 can then be drained out of the compressible element 200 through the drain hole 225, provided the contained volumes 226 are connected to one another. The drain hole 225 is then filled with an uncured elastomer, a same material as the elastomer matrix 210 in an embodiment, and cured to close the contained volume 226.

Figure 3B:
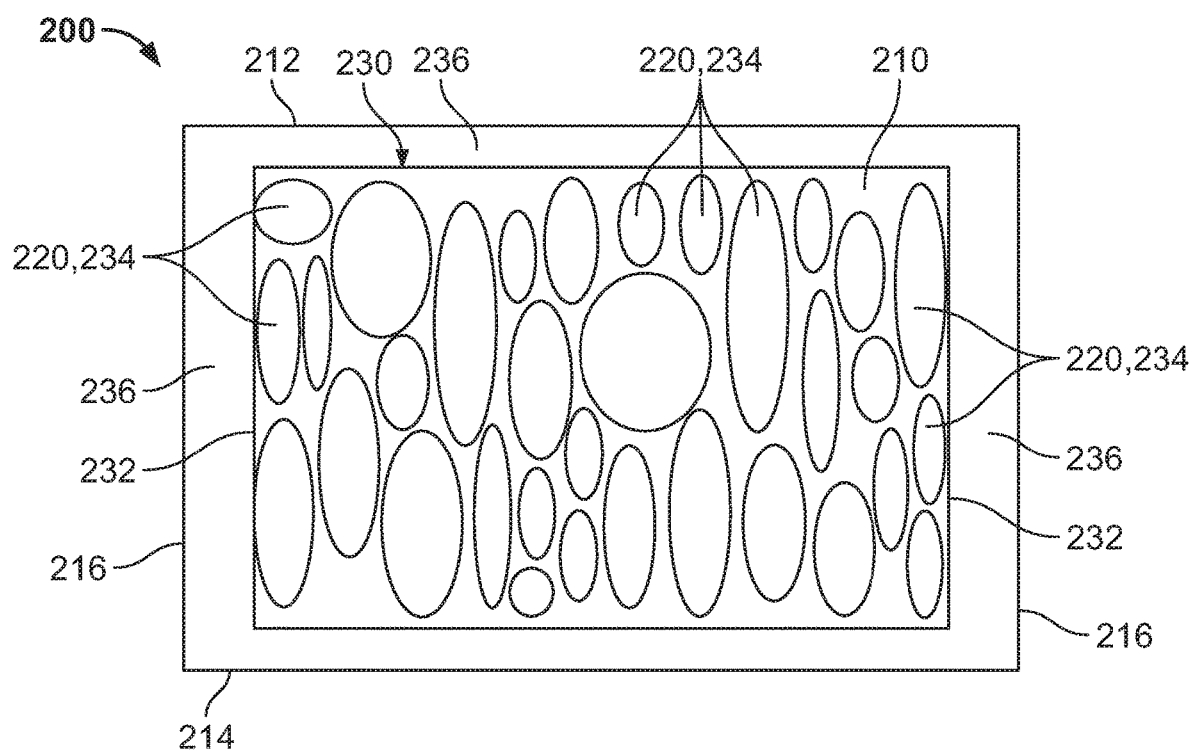
FIG. 3B is a sectional side view of a compressible element according to another embodiment.

The compressible element 200 according to another embodiment is shown in FIGS. 3A and 3B. FIGS. 3A and 3B are shown in a section that does not intersect the passageway 240; although the passageway 240 is not shown, the passageway 240 is still present in the embodiment shown in FIGS. 3A and 3B as in the embodiments of FIGS. 1-2C.

As shown in FIGS. 3A and 3B, the compressible element 200 includes a base matrix 230 formed of the elastomer matrix 210 with a plurality of cells 234 disposed within the base matrix 230. The cells 234 are hollow voids. The cells 234 in the shown embodiment are of varying size, varying shape, and have a varying thickness of the base matrix 230 between one of the cells 234 and a nearest adjacent cell 234. The base 230 matrix has a pair of sides 236. At least some of the cells 234 are an open area open on the sides 236 of the base matrix 230. In an embodiment, the base matrix 230 is formed by cutting a section from a closed-cell porous elastomer.

The elastomer matrix 210 of the embodiment of FIGS. 3A and 3B includes a seal layer 232 disposed around the base matrix 230. The seal layer 232 closes the cells 234 exposed on the sides 236, defining all of the cells 234 as closed areas 220. The seal layer 232 is formed of an elastomeric material. In an embodiment, the elastomeric material of the seal layer 232 can be selected for chemical compatibility.

In the embodiment shown in FIG. 3A, the seal layer 232 is applied on the sides 236 of the base matrix 230. The seal layer 232 can be applied as shown in the embodiment of FIG. 3A by, for example, rolling the base matrix 230 in an uncured seal layer 232 and then curing the seal layer 232.

In the embodiment shown in FIG. 3B, the seal layer 232 is applied around an entire perimeter of the base matrix 230 including the sides 236. The seal layer 232 can be applied as shown in the embodiment of FIG. 3B by, for example, encapsulating the base matrix 230 in the uncured seal layer 232 and a mold, and then curing the seal layer 232.

Figure 4:
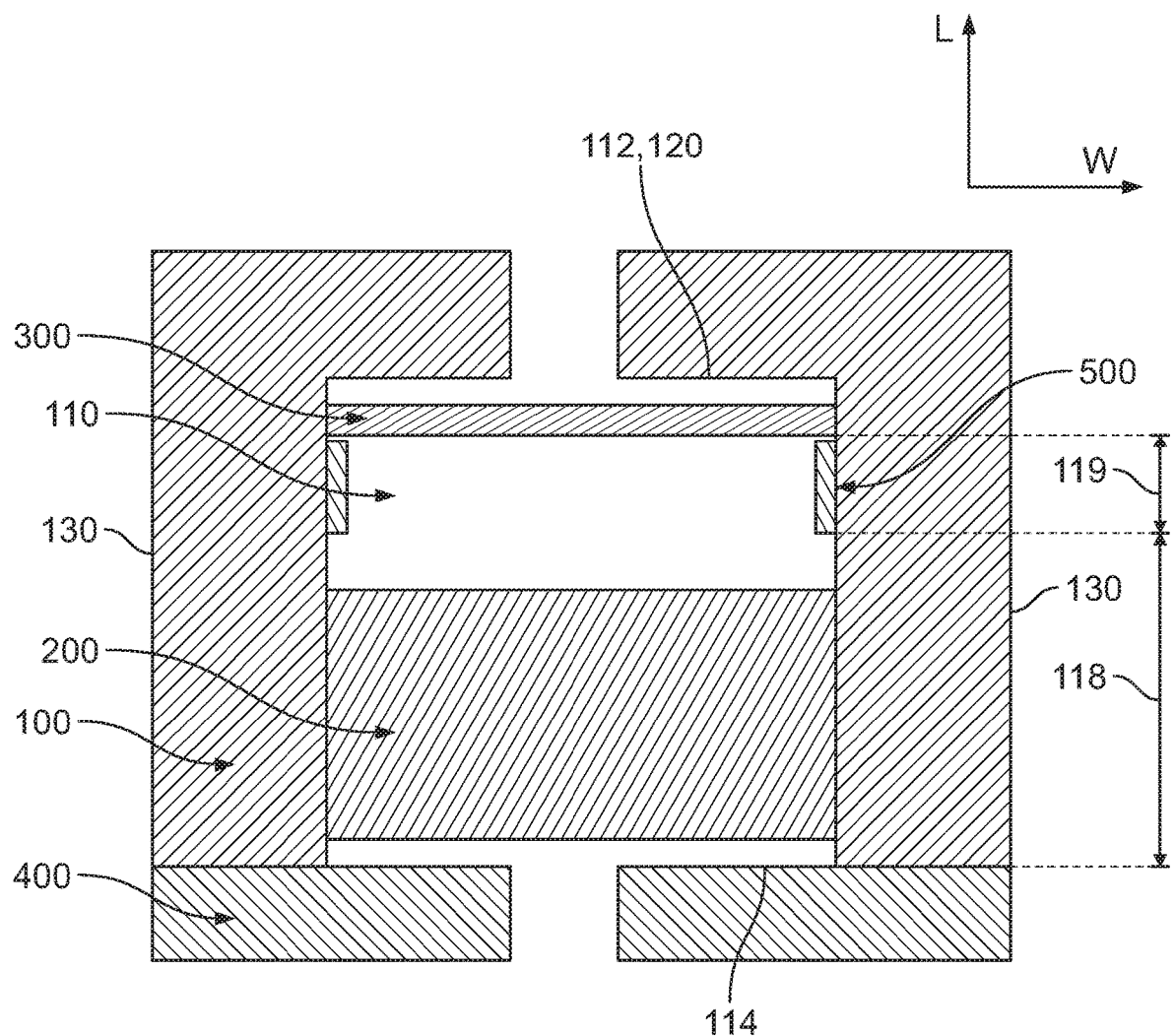
FIG. 4 is a schematic diagram of a sensor assembly according to another embodiment.
Figure 5:
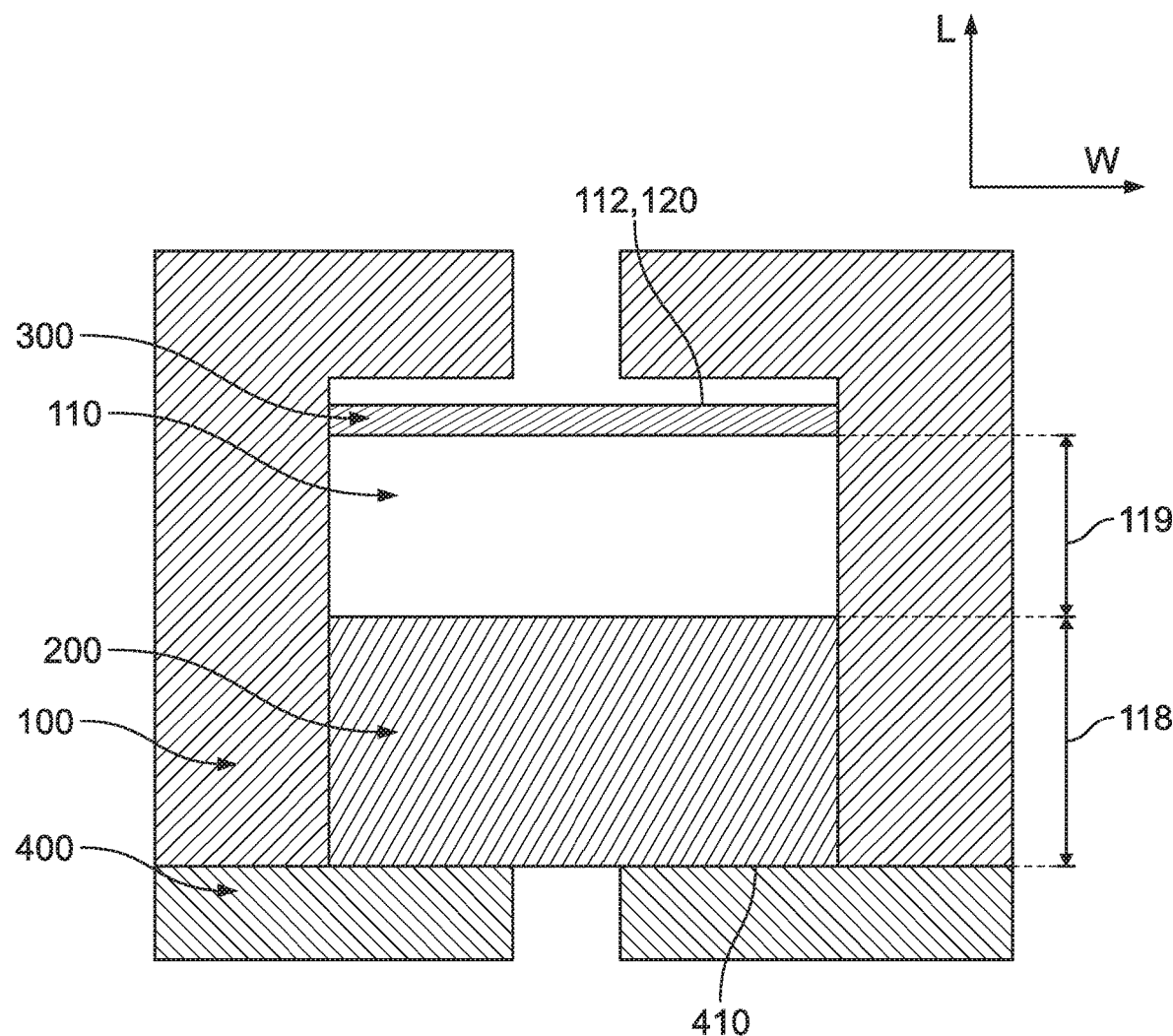
FIG. 5 is a schematic diagram of a sensor assembly according to another embodiment.

As shown in FIGS. 1, 4, and 5, the sensor assembly 10 is assembled with the compressible element 200 and the sensor element 300 disposed within the cavity structure 100. The sensor element 300 is positioned at the interior end 112 of the cavity 110 along the interior surface 120 of the cavity structure 100. The ledge adapter 400 is attached to the cavity structure 100 to at least partially cover the exterior end 114 of the cavity 110. The ledge adapter 400 can be attached to the cavity structure 100 by welding or by any other type of fastening.

The compressible element 200 according to the embodiments shown in FIGS. 1-3B is positioned within the cavity 110 and, as shown in FIGS. 4 and 5, is held and restricted in the length direction L within a portion 118 of the cavity 110 that is separated from the sensor element 300 by a sensor gap 119. In various embodiments, for example, the sensor gap 119 is at least 10 mm and, in another embodiment, is at least 30 mm. The portion 118 and the sensor gap 119 are present in the embodiment of the sensor assembly 10 shown in FIG. 1, however, the portion 118 and the sensor gap 119 are only shown in the schematic diagrams of FIGS. 4 and 5 for ease of understanding of the drawings.

In the embodiment shown in FIG. 1, the compressible element 200 is held within the cavity 110 by an interference fit with the cavity structure 100. The elastomer width 218, in an uncompressed state of the compressible element 200, is greater than the cavity width 116 in the width direction W. In an embodiment, the elastomer width 218 is at least 6% greater than the cavity width 116.

When the compressible element 200 is inserted into the cavity 110, the compressible element 200 is compressed to a compressed state by the cavity wall 130 in the width direction W. The compression of the compressible element 200 results in a radial force FR imparted by the compressible element 200 outwardly on the cavity wall 130 in the width direction W. The radial force FR increases a friction between the compressible element 200 and the cavity wall 130 in the length direction L, restricting the compressible element 200 within the portion 118 separated from the sensor element 300 by the sensor gap 119.

Other embodiments of restricting the compressible element 200 within the portion 118 of the cavity 110 are shown in FIGS. 4 and 5. In each of the embodiments of FIGS. 4 and 5, the compressible element 200 is shown schematically in a section that does not intersect the passageway 240, however, the passageway 240 is still present in the embodiments shown in FIGS. 4 and 5 as in the embodiments of FIGS. 1-2C.

In the embodiment shown in FIG. 4, the sensor assembly 10 includes a stopper 500 disposed within the cavity 110. The stopper 500 is positioned on the cavity wall 130 in the sensor gap 119 and protrudes into the cavity 110 in the width direction W. The stopper 500 is a physical barrier preventing the compressible element 200 from moving along the length direction L into the sensor gap 119, thereby maintaining the sensor gap 119 between the sensor element 300 and the compressible element 200. In various embodiments, the sensor assembly 10 could include a single stopper 500 disposed on a portion of the cavity wall 130, a single stopper 500 extending around entirety of the cavity wall 130, or a plurality of stoppers 500 disposed on the cavity wall 130. The compressible element 200 shown with the stopper 500 in the embodiment of FIG. 4 could further be interference fit with the cavity structure 100 as described above with reference to FIG. 1.

In the embodiment shown in FIG. 5, the compressible element 200 is attached to a surface 410 of the ledge adapter 400 facing the cavity 110. In an embodiment, the compressible element 200 can be deposited in an uncured state on the surface 410 and cured on the surface 410. In another embodiment, a vinyl silane is first disposed on the surface 410, and the uncured compressible element 200 is then deposited on the surface 410 and cured. Curing the compressible element 200 on the surface 410 forms an adhesion between the compressible element 200 and the ledge adapter 400, restricting the compressible element 200 within the portion 118 of the cavity 110 and preventing the compressible element 200 from moving along the length direction L into the sensor gap 119. The embodiment shown in FIG. 5 can optionally be combined with either or both of the embodiments shown in FIGS. 1 and 4 and described above.

An exemplary use of the sensor assembly 10 will now be described with reference to FIG. 1. In the embodiment shown in FIG. 1, the sensor assembly 10 includes a housing 600 to which the cavity structure 100 is attached. In the shown embodiment, the sensor assembly 10 is a pressure sensor assembly and the housing 600 is attached to a tank T. An area A exterior of the cavity structure 100 is disposed within the tank T and is filled with a fluid, for example, DEF.

In the exemplary embodiment of FIG. 1, the fluid in the area A flows into the cavity 110 and through the passageway 240 to contact the sensor element 300. The sensor element 300 in contact with the fluid measures a reservoir level of the fluid in the tank T and a pressure of the fluid. The fluid contacts at least the interior side 212, and in the shown embodiment also contacts the exterior side 214, of the compressible element 200. Under certain conditions, the fluid freezes, resulting in an expansion of the fluid.

The compressible element 200 compresses when the fluid freezes, compensating for an increased volume of the fluid to avoid damage to the sensor element 300. The compensation volume of the compressible element 200 can be selected for the particular application and depends on the compressibility of the compressible element 200 and the total volume of the compressible element 200. The compressibility of the compressible element 200 is dictated by selection of the hardness of the elastomer matrix 210 and the size and total volume of the closed areas 220 as described above. The volume of the compressible element 200 is determined by the elastomer width 218 and the elastomer length 219. The required compensation volume, determining selection of the compressibility and volume of the compressible element 200, is determined based on the expected volume variation of the fluid.

In other embodiments, the sensor assembly 10 can be used with fluids other than DEF, and can be used to measure qualities of the fluid other than pressure, for example, a temperature of the fluid. The sensor assembly 10 can be used in any application in which a volume compensation is required to protect the sensor element 300.

The sensor assembly 10 of the embodiments of the invention described herein has the compressible element 200 to provide volume compensation protecting the sensor element 300. The elastomer matrix 210 of the compressible element 200 includes only closed areas 220 that are evenly spaced from another. Consequently, the compressible element 200 is resilient by virtue of being impenetrable to a fluid and having a mechanically strong internal structure. Further, the restriction of the compressible element 200 within the portion 118 spaced apart from the sensor element 300 by the sensor gap 119 improves the accuracy and reliability of the sensor element 300 by preventing the compressible element 200 from contacting the sensor element 300.

What is claimed is:

1. A compressible element for a sensor assembly, comprising:
    an elastomer matrix having a first compressibility; and
    a plurality of closed areas distributed within the elastomer matrix and each surrounded by the elastomer matrix, each of the closed areas has a second compressibility greater than the first compressibility.

2. The compressible element of claim 1, wherein the elastomer matrix does not have any areas within the elastomer matrix that are open to a side of the elastomer matrix.

3. The compressible element of claim 1, wherein each of the closed areas is a hollow void.

4. The compressible element of claim 3, wherein each of the closed areas is a contained volume formed as a polyhedron.

5. The compressible element of claim 3, wherein the plurality of closed areas are connected to one another to form a continuous closed area surrounded by the elastomer matrix.

6. The compressible element of claim 1, wherein each of the closed areas is filled with a solid material having the second compressibility.

7. The compressible element of claim 1, wherein each of the closed areas is formed by a polymeric microsphere.

8. The compressible element of claim 1, further comprising a passageway extending through the elastomer matrix from an interior side of the elastomer matrix to an exterior side of the elastomer matrix.

9. The compressible element of claim 1, wherein the elastomer matrix has approximately a same thickness disposed between each one of the closed areas and a nearest adjacent closed area.

10. The compressible element of claim 1, wherein the elastomer matrix includes a first shell, a second shell identical to the first shell, and an adhesive attaching the first shell to the second shell to define the plurality of closed areas.

11. The compressible element of claim 1, wherein the elastomer matrix includes a base matrix and a seal layer disposed around the base matrix.

12. The compressible element of claim 11, wherein the base matrix has a plurality of cells disposed within the base matrix with at least one of the cells open on a side of the base matrix, the seal layer is disposed on the base matrix to define the cells as the plurality of closed areas.

13. A sensor assembly, comprising:
    a cavity structure defining a cavity having an interior surface;
    a sensor element positioned on the interior surface of the cavity structure and sensing a fluid in the cavity; and
    a compressible element positioned in the cavity and restricted within a portion of the cavity separated from the sensor element by a sensor gap.

14. The sensor assembly of claim 13, wherein the compressible element in an uncompressed state has an elastomer width greater than a cavity width of the cavity.

15. The sensor assembly of claim 14, wherein the compressible element is positioned in the cavity in a compressed state and exerts a radial force on a cavity wall of the cavity structure.

16. The sensor assembly of claim 13, further comprising a stopper disposed in the sensor gap, the stopper preventing movement of the compressible element into the sensor gap.

17. The sensor assembly of claim 13, wherein the compressible element includes an elastomer matrix having a first compressibility and a plurality of closed areas distributed within the elastomer matrix and each surrounded by the elastomer matrix, each of the closed areas has a second compressibility greater than the first compressibility.

18. The sensor assembly of claim 17, wherein the compressible element has a passageway extending through the elastomer matrix, the passageway communicating with the sensor gap.

19. A sensor assembly, comprising:
    a cavity structure defining a cavity having an interior surface;
    a sensor element positioned on the interior surface of the cavity structure;
    a compressible element positioned in the cavity and restricted within a portion of the cavity separated from the sensor element by a sensor gap; and
    a ledge adapter attached to the cavity structure and extending over at least a part of an exterior end of the cavity opposite the interior surface.

20. The sensor assembly of claim 19, wherein the compressible element is attached to a surface of the ledge adapter facing the cavity.

* * * * *